(12) United States Patent
Tesfe et al.

(10) Patent No.: US 11,825,860 B1
(45) Date of Patent: Nov. 28, 2023

(54) DENATURED MILK PROTEINS AND METHODS OF MAKING THEM

(71) Applicant: Leprino Foods Company, Denver, CO (US)

(72) Inventors: Paulos Tesfe, Commerce City, CO (US); Jiancai Li, Englewood, CO (US); Bradley Maier, Broomfield, CO (US); Richard K. Merrill, Highlands Ranch, CO (US)

(73) Assignee: Leprino Foods Company, Denver, CO (US)

(*) Notice: Subject to any disclaimer, the term of this patent is extended or adjusted under 35 U.S.C. 154(b) by 0 days.

(21) Appl. No.: 18/097,003

(22) Filed: Jan. 13, 2023

(51) Int. Cl.
*A23C 19/084* (2006.01)
*A23J 3/08* (2006.01)

(52) U.S. Cl.
CPC ..................... *A23J 3/08* (2013.01)

(58) Field of Classification Search
CPC .......................................... A23J 3/08
USPC ........................................ 426/657
See application file for complete search history.

(56) References Cited

U.S. PATENT DOCUMENTS

| | | |
|---|---|---|
| 5,968,586 A | 10/1999 | Etzel |
| 9,578,890 B2 | 2/2017 | Li et al. |
| 10,709,146 B2 | 7/2020 | Mikkelsen et al. |
| 10,834,934 B2 | 11/2020 | Mikkelsen et al. |
| 11,206,846 B2 | 12/2021 | Li et al. |
| 2018/0242608 A1* | 8/2018 | Tikanmäki ............ A61K 35/20 |

FOREIGN PATENT DOCUMENTS

| | | |
|---|---|---|
| WO | 2002/045522 A1 | 6/2002 |
| WO | 2006/089921 A1 | 8/2006 |
| WO | 2015/059245 A1 | 4/2015 |

* cited by examiner

*Primary Examiner* — Brent T O'Hern
(74) *Attorney, Agent, or Firm* — Kilpatrick Townsend & Stockton LLP

(57) ABSTRACT

The present disclosure includes denatured whey protein compositions. The compositions include at least 60 wt. % protein on a dry weight basis, less than 8 wt. % native glycomacropeptide (GMP), greater than 2 wt. % enzymatically hydrolyzed GMP relative to the total weight of the protein, a proteolysis index of at least 8 wt. %, and greater than 50 wt. % denatured whey proteins relative to the total weight of the protein.

20 Claims, 10 Drawing Sheets

DENATURED MILK PROTEINS AND METHODS OF MAKING THEM

FIELD

The present technology relates to denatured whey protein compositions, including denatured whey proteins having low native glycomacropeptide levels.

BACKGROUND

Powdered milk-derived products such as milk proteins, aldobionic products, and galactooligosaccharides, have become a major source of ingredients in a wide variety of foods and beverages. Milk-derived proteins, for example, have become a major source of protein-fortification in nutrition bars, sports drinks, and yogurt products. One source of milk proteins is the whey protein that is produced as a byproduct of cheese making. During cheesemaking, the casein proteins in the milk are formed into cheese curds while the liquid whey is drained from the curds and diverted for further processing. In most cheesemaking processes, the liquid whey is a mixture of whey proteins and a significant amount of lactose and minerals, and the mixture undergoes additional purification to separate the whey proteins from the lactose and minerals.

Whey proteins derived from cheesemaking also include additional byproducts, such as cheesemaking enzymes and the hydrolyzed proteins they generate. The native glycomacropeptides (GMPs) are considered an inferior source of protein for muscle recovery because they have fewer branched chain amino acids, especially leucine, that stimulate muscle protein synthesis and are a major building block in muscle tissue following periods of intense exercise and resistance training. In addition, a high native GMP content in whey protein compositions can lead to undesirable flavor and poor process incorporation, reducing the total amount of protein capable of being fortified into the product. These and other challenges are addressed by the present technology.

BRIEF SUMMARY

In general, embodiments of the present disclosure include a denatured whey protein composition. The composition includes at least 60 wt. % protein on a dry weight basis, less than 8 wt. % native glycomacropeptide (GMP), greater than 2 wt. % enzymatically hydrolyzed GMP relative to the total weight of the protein, a proteolysis index of at least 8 wt. %, and greater than 50 wt. % denatured whey proteins relative to the total weight of the protein.

In some embodiments, the denatured whey proteins can include denatured enzymatically hydrolyzed cheese whey proteins. In additional or alternative embodiments, the native GMP is less than or about 7 wt. % relative to the total weight of the protein. In further embodiments, the denatured whey proteins are characterized by a D50 particle size distribution value of less than or about 4.5 μm. In yet more embodiments, the denatured whey proteins are further characterized by a D10 particle size distribution value of less than or about 2.5 μm. In additional embodiments, the denatured whey proteins are further characterized by a D90 particle size distribution value of less than or about 8 μm. In further embodiments, the denatured whey protein composition can include at most 7.0 wt. % fat on a dry weight basis. In embodiments, the denatured whey protein composition can include at least 2% fat.

Embodiments of the present technology also include a method of making a denatured whey protein composition. The method includes filtering cheese whey from enzymatically coagulated milk, creating a retentate and a permeate, combining the cheese whey retentate with one or more enzymes that selectively hydrolyze GMP in the cheese whey retentate to form a reduced-GMP cheese whey retentate composition, and heating the reduced-GMP cheese whey retentate composition to form the denatured whey protein composition. The denatured whey protein composition may be characterized by containing at least 60 wt. % protein on a dry weight basis, less than 8 wt. % GMP and greater than 2 wt. % enzymatically hydrolyzed GMP relative to the total weight of the protein, a proteolysis index of at least 8.0 wt. %, and greater than 50 wt. % denatured whey proteins relative to the total weight of the protein.

Embodiments of the present technology also include a method of making a denatured whey protein composition. The method includes filtering cheese whey from enzymatically coagulated milk, creating a retentate and a permeate, reducing native glycomacropeptides in the cheese whey retentate to form a reduced-GMP cheese whey retentate composition, and heating the reduced-GMP cheese whey retentate composition to form the denatured whey protein composition. The denatured whey protein composition may be characterized by containing at least 60 wt. % protein on a dry weight basis, less than 11 wt. % GMP relative to the total weight of the protein, a proteolysis index of at least 8.0 wt. % or a beta-lactoglobulin to alpha lactalbumin ratio of greater than 5.00, and greater than 50 wt. % denatured whey proteins relative to the total weight of the protein.

In additional embodiments, the one or more enzymes that selectively hydrolyze GMP in the cheese whey retentate include at least one alkaline serine protease enzyme and at least one neutral protease enzyme. In embodiments, the reduction of GMP includes combining the cheese whey retentate with one or more enzymes that selectively hydrolyze GMP in the cheese whey retentate or the reduction of GMP occurs through the microfiltration of the cheese whey retentate. In more embodiments, the one or more enzymes that selectively hydrolyze GMP in the cheese whey retentate includes at least one alkaline serine protease enzyme and at least one neutral protease enzyme. In further embodiments, the heating of the reduced-GMP cheese whey retentate composition also inactivates the one or more enzymes that selectively hydrolyze the GMP in the cheese whey retentate. In still additional embodiments the reduced-GMP cheese whey retentate composition is heated to a temperature of greater than or about 160° F. In more embodiments, the heating of the reduced-GMP cheese whey retentate composition further includes exposing the reduced-GMP cheese whey retentate composition to high shear conditions. In yet further embodiments, the denatured whey protein composition is characterized by a weight ratio of native GMP to total whey protein of less than or about 0.15. Additionally, or alternatively, the denatured whey protein composition is characterized by less than or about 11 wt. % GMP relative to the total weight of the protein. In more embodiments, the denatured whey protein composition is characterized by less than or about 8 wt. % GMP relative to the total weight of the protein. In additional embodiments, the denatured whey protein composition is characterized by at most 7 wt. % fat on a dry weight basis. In further embodiments, the denatured whey proteins in the denatured whey protein composition are characterized by a D50 particle size distribution value of less than or about 5 μm.

Embodiments of the present technology also include a denatured whey protein composition. The composition includes at least 60 wt. % protein on a dry weight basis, less than 11 wt. % native GMP relative to the total weight of the protein, greater than 7 wt. % fat on a dry basis, a beta-lactoglobulin to alpha lactalbumin ratio of greater than 5.00, and greater than 50 wt. % denatured whey proteins relative to the total weight of the protein.

In some embodiments, the whey protein prior to denaturation already includes at least 30 wt. % denatured protein. In additional embodiments, the whey protein contains at least 60 wt. % beta lactoglobulin relative to the total weight of protein. Additionally or alternatively, in embodiments, the whey protein contains at most 12 wt. % alpha lactalbumin relative to the total weight of protein. In further embodiments, the whey protein includes a weight ratio of beta lactoglobulin to alpha lactalbumin of greater than or about 7. In more embodiments, the native GMP is less than or about 10.5 wt. % relative to the total weight of the protein. In further embodiments, the denatured whey proteins are characterized by a D50 particle size distribution value of less than or about 0.3 μm. In yet more embodiments, the denatured whey proteins are further characterized by a D10 particle size distribution value of less than or about 0.1 μm. In additional embodiments, the denatured whey proteins are further characterized by a D90 particle size distribution value of less than or about 1.0 μm.

Embodiments of the present technology include a protein fortified food product. Embodiments include where the food product contains at least 3 wt. % total protein. In embodiments, the protein includes a denatured whey protein composition containing less than 8 wt. % native glycomacropeptide and greater that 2 wt. % enzymatically hydrolyzed glycomacropeptide relative to the total weight of the whey protein composition.

Embodiments of the present technology also include a protein fortified food product. The food product contains at least 3 wt. % total protein. The protein includes a denatured whey protein composition containing less than 11 wt. % native glycomacropeptide relative to the total weight of the whey protein composition, greater than 7 wt. % fat and a beta-lactoglobulin to alpha-lactalbumin ratio of greater than 5.00.

BRIEF DESCRIPTION OF THE DRAWINGS

A further understanding of the nature and advantages of selected embodiments of the present technology may be realized by reference to the remaining portions of the specification and the drawings wherein like reference numerals may be used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

Figure 1:
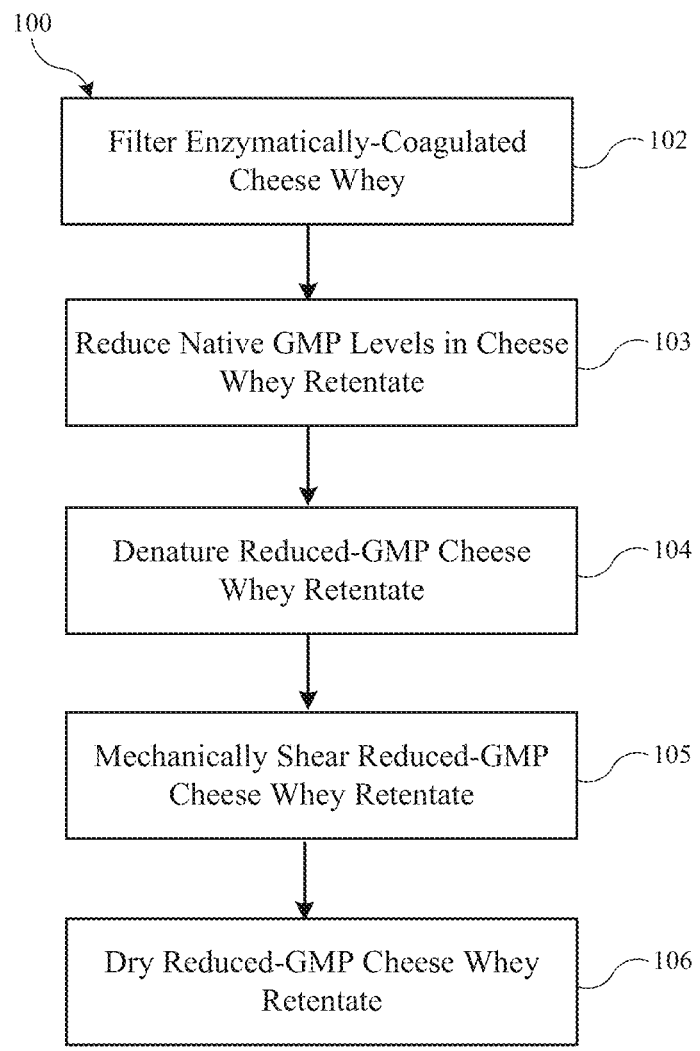
FIG. 1 shows selected operations in a formation method according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Whey protein, as referred to herein, is actually a collection of different proteins that primarily include β-lactoglobulin (β-Lg) and α-lactalbumin (α-La), as well as glycomacropeptides (GNPs, sometimes referred to as cGMP or CMP) cleaved by chymosin activity from the native kappa-casein protein in the milk resulting in milk coagulation into the cheese curd. Depending on the purification process and the extent of purification, a whey protein concentrate (WPC) may be formed through concentration of the whey protein to 25-90 wt. % of protein as a percentage of the total weight of solids, or whey protein isolate (WPI) may be formed through the concentration of the whey proteins to 90-99 wt. % of protein as a percentage of the total weight of solids.

Whey proteins derived from cheesemaking also include additional byproducts, such as cheesemaking enzymes and the hydrolyzed proteins they generate. For instance, conventional compositions of whey obtained from enzymatically coagulated Bovine milk* typically contain:

| Beta-lactoglobulin (wt. %) | Alpha-lactalbumin (wt. %) | Ratio of Beta-lg to Alpha-lg | Glycomacro-peptide (wt. %) | Total Protein (WPC) | Ratio of GMP to Total Protein |
|---|---|---|---|---|---|
| 50-60 | 12-16 | 3.13 to 5.00 | 15-21 | 25-80 | 0.19 to 1.00 |

* 1 Walstra P, Wouters JTM, Geurts TJ. Milk Components, Dairy Science and Technology. 2nd ed. CRC Press; 2006: Chapter 2.
2 Foegeding EA, Luck P, Vardhanabhuti B. Encyclopedia of Dairy Sciences. 2nd ed. Elsevier Ltd.; 2011: Whey Protein Products.

The hydrolyzed proteins include glycomacropeptides (GMPs) that are hydrolyzed from κ-casein so that the resulting para-κ-casein can form a major component of cheese curd. The smaller, more soluble GMPs are carried away with the whey proteins and can constitute 13-20 wt. % of the protein present in the whey protein fraction on a dry weight basis. Unfortunately, the GNPs are considered an inferior source of protein for muscle recovery because they have fewer branched chain amino acids that stimulate muscle protein synthesis and are a major building block in muscle tissue following periods of intense exercise and resistance training.

In addition, a high native GMP content in whey protein compositions can lead to undesirable flavor and poor process incorporation. Namely, high native GMP content, such as 12 wt. % or more of the protein present in the whey protein fraction on a dry weight basis, contributes to increased cardboard flavor, a common off-flavor and/or artificial flavor in liquid whey, dried whey, dairy protein concentrates and milk, and a reduction of natural milky flavor. In addition, native whey proteins can also interact with water in a food or beverage product, negatively increasing the viscosity of the food or beverage product. The interactions are problematic, as it can cap the amount of a whey protein composition that can be incorporated, reducing the total amount of protein fortified into the product.

The present technology overcomes these issues by providing denatured whey protein compositions, such as powdered or denatured whey protein compositions, that exhibit a high total percentage of protein by weight, but with a reduced percentage of such protein attributable to native GMP. Namely, the present technology has surprisingly found that by carefully processing a whey protein composition to selectively reduce native GMP levels without hydrolyzing the remaining proteins (e.g., β-lactoglobulin (β-Lg), and α-lactalbumin (α-La)) in the whey protein composition, a high protein denatured whey protein composition with a low percentage of native GMP can be provided. It was observed that such denatured whey protein compositions do not exhibit the negative effects of compositions that contain high weight percentages of native GMP.

For instance, compositions according to one or more embodiments of the present disclosure may exhibit lower in process viscosity and reduced cardboard flavor and more milky flavor. Namely, the present disclosure has surprisingly found that when the native GMP is enzymatically reduced in the whey protein composition there is a reduction in process viscosity such that the viscosity is about 10% less than a viscosity of a composition where the native GMP is not enzymatically reduced, such about 20% less, such as about 30% less, such as about 40% less, such as about 50% less than a viscosity of a non-enzymatically reduced composition. For instance, in a composition that has not been enzymatically reduced as discussed herein, the process viscosity of the composition may be greater than 200 centipoise, such as from 201 centipoise to 500 centipoise. Conversely, compositions according to the present technology exhibit a process viscosity of less than 200 centipoise, such as about 175 centipoise or less, such as about 150 centipoise or less, such as about 125 centipoise or less, such as about 100 centipoise or less, such as about 75 centipoise or less, such as about 50 centipoise or less, such as down to about 25 centipoise, or any ranges or values therebetween. In some embodiments, compositions according to the present technology may also have reduced ability to bind water. Thus, compositions according to the present technology may be uniquely suited to fortify water-containing foods to levels higher than previously believed possible with whey protein compositions, as there is lower observed viscosity increases typically associated with these formulations, due at least in part to the reduced interactions with water.

FIG. 1 shows exemplary operations in a method 100 according to some embodiments of the present technology. The method may be performed in a variety of processing apparatus as known in the art. Method 100 may include a number of optional operations, which may or may not be specifically associated with some embodiments of methods according to the present technology. For example, many of the operations are described to provide a broader scope of the composition formation, but are not critical to the technology, or may be performed by alternative methodology as would be readily appreciated.

The whey composition feedstock utilized herein may be obtained from a cheesemaking process, a whey protein concentrate, a whey protein isolate, such as derived from cow's milk, or a combination thereof. In some embodiments, the whey feedstock may be generated from the cheesemaking process and may be referred to as "sweet whey" when the cheesemaking process uses rennet enzymes like chymosin, and "acid whey" when acids are used to form the curds. The pH of sweet whey typically ranges from about 5.6 to 6.6, while the pH of acid whey typically ranges from 4.3 to 4.6. While any appropriate whey feedstock may be utilized, in some embodiments, the whey feedstock utilized to form a denatured whey protein composition is a "sweet whey" and may therefore be considered to be filtered 102 from lactose and minerals.

For instance, in some embodiments, the whey protein feedstock may be a whey protein retentate filtered 102 from sweet whey having a protein composition of 25% protein or greater, on a dry weight basis, such as about 50% or greater, such as about 60% or greater, such as about 70% or greater, such as about 80% or greater, or any ranges or values therebetween. In embodiments the whey protein retentate may be concentrated utilizing ultrafiltration, or other methods as known in the art. Nonetheless, in some embodiments, the whey protein retentate may be diluted prior to processing, such as by mixing with water to form a whey protein feedstock having a protein concentration in the solution of about 30% or less, such as about 18% or less, such as about 16% or less, such as about 15% or less, such as about 14% or less, or any ranges or values therebetween.

In some embodiments, the native GMP levels of the whey protein feedstock may be reduced 103 utilizing one or more enzymes that selectively reduce native GMP levels without hydrolyzing the β-lactoglobulin and/or α-lactalbumin. GMP may also be reduced through the use of expensive chromatography systems, or by blending native whey protein isolate purified directly from milk that has not undergone cheesemaking with whey protein concentrates from cheese-making. In embodiments, the one or more enzymes can be one or more protease enzymes. Sources for the one or more protease enzymes may include microorganisms, fungi, plant, and/or animal sources, among others. For example, the one or more protease enzymes may be derived from fungi of the genus *Aspergillus*, bacteria of the genus *Bacillus* (e.g., *Bacillus subtilis*), and/or animals (e.g., trypsin, chymotrypsin, etc.), among other sources. Nonetheless, in some embodiments, the one or more protease enzymes include an acid protease enzyme, a neutral protease enzyme, an alkaline protease enzyme, or a combination thereof. However, in some embodiments, the one or more protease enzymes include a neutral protease enzyme, an alkaline protease enzyme, or a combination thereof. Additionally, or alternatively, the protease enzyme can be an endoprotease, an exoprotease, or a combination thereof. Thus, in some embodiments, the one or more protease enzymes can include an aspartic protease, serine protease, a cysteine protease, or a combination thereof. Nonetheless, in one embodiment, the one or more protease enzymes can include a serine protease, such as an alkaline serine protease, alone or in combination with at least one neutral protease enzyme.

Notwithstanding the one or more enzymes selected, the one or more enzymes selected may be added to the whey protein feedstock in an amount of about 0.001 wt. % or greater, based upon the weight of the total protein in the composition, such as about 0.0025 wt. % or greater, such as about 0.005 wt. % or greater, such as about 0.0075 wt. % or greater, such as about 0.01 wt. % or greater, or any ranges or values therebetween. It should be understood that the foregoing ranges may refer to a total amount of enzymes included in the whey protein feedstock, or to an amount of each enzyme added to the whey protein feedstock.

However, in one aspect, the amount of the one or more enzymes added is selected so as to hydrolyze at least about 10 wt. % or more of the native GMP present in the whey protein feedstock, such as about 15 wt. % or more, such as about 20 wt. % or more, such as about 25 wt. % or more, such as about 30 wt. % or more, such as about 35 wt. % or more, such as about 40 wt. % or more, such as about 45 wt. % or more, such as about 50 wt. % or more, such as about 60 wt. % or more, such as about 65 wt. % or more, such as about 70 wt. % or more, such as about 72.5 wt. % or more, such as about 75 wt. % or more, such as about 80 wt. % or more, such as about 85 wt. % or more, or any ranges or values therebetween. Stated differently, in some embodiments, the denatured whey protein composition according to the present technology may have a reduced amount of native GMP as compared to a whey protein feedstock, according to any one or more of the above percentages.

Regardless of the amount of the one or more enzymes selected, the GMP selective enzyme(s) are added to the whey protein feedstock to hydrolyze the native GMP in the whey protein composition. In some embodiments, the hydrolysis phase can continue for about 72 hours or less, such as about 60 hours or less, such as about 48 hours or less, such as about 36 hours or less, such as about 24 hours or less, such as about 12 hours or less, such as about 10 hours or less, such as about 8 hours or less, such as about 5 hours or more, or any ranges or values therebetween. The hydrolysis may occur at a temperature of about 60° F. or less, such as about 55° F. or less, such as about 50° F. or less, such as about 45° F. or less, or any ranges or values therebetween.

Nonetheless, in some embodiments, the native GMP levels of the whey protein feedstock may be reduced 103 by utilizing a high-fat feedstock. By using the whey protein retentate from a microfiltration process in which a portion of the GMP permeates the microfiltration membrane a whey protein feedstock can be provided with desirably low native GMP levels and high denatured whey protein levels. Thus, in some embodiments of the present technology, a high fat content feedstock can be utilized having a fat content of about 7% or greater, based upon the dry basis weight of the whey protein feedstock, such as about 8% or greater, such as about 9% or greater, such as about 10% or greater, such as about 11% or greater, such as about 12% or greater, such as about 13% or greater, such as about 14% or greater, such as about 15% or greater, such as about 16% or greater, such as about 17% or greater, such as about 18% or greater, such as about 19% or greater, such as about 20% or greater, such as about 20.5% or greater, or any ranges or values therebetween.

In some embodiments, the low native GMP and high fat levels discussed above in the high fat feedstock can be obtained or improved by utilizing a microfiltration membrane (such as a microfiltration membrane having a pore size of about 0.5 micrometers or less, such as about 0.4 micrometers or less, such as about 0.3 micrometers or less, or such as about 0.08 micrometers or greater, or any ranges therebetween) filtration process. Namely, in some embodiments, a microfiltration membrane process can be selected so as to retain denatured whey proteins and fat while allowing some or all native proteins, including native GMP to pass through to a permeate side. It should be understood that, in some embodiments, other filtration methods may be utilized to provide the high fat, low native GMP feedstock.

However, in embodiments where a microfiltration membrane was utilized, it was also surprisingly found that the ratio of β-lactoglobulin to α-lactalbumin can be increased. Namely, without wishing to be bound by theory, β-lactoglobulin may be more prone to early denaturation compared to α-lactalbumin. Thus, the β-lactoglobulin may largely be retained by the membrane with the denatured whey proteins whereas a higher proportion of the α-lactalbumin passes through with the permeate. In some embodiments, a whey protein feedstock composition according to the present technology exhibits a ratio of β-lactoglobulin to α-lactalbumin of about 2.75 or greater, such as about 3 or greater, such as about 3.5 or greater, such as about 4 or greater, such as about 4.5 or greater, such as about 5 or greater, such as about 5.5 or greater, such as about 6 or greater, such as about 6.5 or greater, such as about 7 or greater, such as about 7.5 or greater, or any ranges or values therebetween.

For instance, in some embodiments, a whey protein feedstock composition can include about 65 wt. % β-lactoglobulin or more, such as about 67.5 wt. % or greater, such as about 70 wt. % or greater, such as about 72.5 wt. % or greater, such as about 75 wt. % or greater, or any ranges or values therebetween. Additionally, or alternatively, in embodiments, a whey protein feedstock composition can include about 15 wt. % or less α-lactalbumin, such as about 12.5 wt. % or less, such as about 10 wt. % or less, such as about 7.5 wt. % or less, or any ranges or values therebetween.

Notwithstanding of the method utilized to reduce the native GMP, the reduced native GMP feedstock may be subjected to denaturation 104 as known in the art. For instance, in some embodiments, the whey protein composition may be heated to a temperature of about 176° F. or greater, such as about 140° F. to about 300° F., such as about 160° F. to about 210° F., such as about 170° F. to about 200° F., or any ranges or values therebetween, where the heating converts at least a portion of the starting whey protein to denatured whey protein. Advantageously, such heating also denatures any enzymes, if utilized. Concurrent with the heating, the slurry may be mixed or agitated to reduce the level of aggregation of the denaturing whey proteins. The slurry may be mixed and heated for about 1 second to about 120 seconds, such as about 2.5 seconds to about 105 seconds, such as about 5 seconds to about 90 seconds, or any ranges or values therebetween.

During or after heating, the denatured whey protein composition can be subjected to mechanical shear conditions 105. In some embodiments, mechanical shear conditions may further denature the whey proteins and/or deactivate the one or more enzymes or may reduce the aggregates that may have formed as the whey proteins denature. Mechanical shear conditions as used herein generally refer to high shear conditions in which at least about 1,000 s$^{-1}$ of shear is applied, such as greater than or about 10,000 s$^{-1}$ of shear is applied, such as greater than or about 50,000 s$^{-1}$ of shear is applied, such as greater than or about 100,000 s$^{-1}$ of shear is applied, up to about 500,000 s$^{-1}$ of shear is applied. In some embodiments, the denatured whey protein composition is typically sheared by a high-shear mixer, colloid mill, or swept surface heat exchanger at a temperature of about 120 to 300° F. for about 0.1 to 120 seconds.

However, it should be understood that, in some embodiments, at least a portion of the proteins in the whey protein composition are denatured prior to heating. For instance, in some embodiments, the whey protein feedstock may have about 5 wt. % or more denatured protein based upon the total weight of the protein in the whey protein feedstock, such as about 20 wt. % or more, such as about 25 wt. % or more, such as about 30 wt. % or more, such as about 35 wt. % or more, such as about 40 wt. % or more, or any ranges or values therebetween.

Nonetheless, after heating, or in the denatured whey protein composition of the present technology, the final protein contains about 45 wt. % or more denatured whey proteins relative to the total weight of the protein in the whey protein composition, such as about 50 wt. % or more, such as about 55 wt. % or more, such as about 60 wt. % or more, such as about 65 wt. % or more, such as about 70 wt. % or more, such as about 75 wt. % or more, such as about 77.5 wt. % or more, such as about 80 wt. % or more, such as about 85 wt. % or more, such as about 90 wt. % or more, or any ranges or values therebetween.

As discussed above, in some embodiments, the denatured whey protein composition can be a high protein denatured whey protein composition and may therefore contain about 50 wt. % or more of protein on a dry weight basis, such as about 55 wt. % or more, such as about 60 wt. % or more, such as about 65 wt. % or more, such as about 70 wt. % or more, such as about 75 wt. % or more, such as about 80 wt. % or more, or any ranges or values therebetween.

Notwithstanding the final composition of proteins, the denatured whey protein composition may be optionally cooled and concentrated after heating and shearing, following by drying 106 to produce a powdered or denatured whey protein composition. Drying processes may include spray drying, heating, and evaporation, among other processes. As will be discussed in greater detail below, the denatured whey protein composition may then be packaged or added directly to other ingredients for making a food or beverage composition.

Regardless of the method utilized to reduce the native GMP, a denatured whey protein composition according to the present technology can include less than 12 wt. % native GMP based upon the total weight of protein in the denatured whey protein composition, such as about 11 wt. % or less, such as about 10 wt. % or less, such as about 9 wt. % or less, such as about 8 wt. % or less, such as about 7 wt. % or less, such as about 6.5 wt. % or less, such as about 6 wt. % or less, such as about 5.9 wt. % or less, such as about 5 wt. % or less, such as about 4 wt. % or less, such as about 3 wt. % or less, such as about 2 wt. % or less, such as about 1 wt. % or less, or any ranges or values therebetween.

Thus, in some embodiments, the denatured whey protein composition may exhibit a weight ratio of native GMP to denatured whey protein of about 0.15 or less, such as about 0.125 or less, such as about 0.1 or less, such as about 0.09 or less, such as about 0.085 or less, or any ranges or values therebetween.

In addition, as may be understood from the above, during hydrolysis of the GMP in the whey protein feedstock, hydrolyzed GMP is formed, and can advantageously remain in the denatured whey protein composition based upon the desired end use. Namely, the present technology has found that the denatured GMP (GMP that has undergone at least one hydrolysis reaction, also referred to herein as enzymatically hydrolyzed GMP) does not exhibit the same adverse effects as the native GMP (such as cardboard flavor/artificial flavor). Thus, in some embodiments, the denatured whey protein composition can contain about 1 wt. % or more of denatured GMP based upon the total weight of protein in the denatured whey protein composition, such as about 2 wt. % or more, such as about 3 wt. % or more, such as about 4 wt. % or more, such as about 5 wt. % or more, such as about 6 wt. % or more, such as about 7 wt. % or more, such as about 8 wt. % or more, such as about 9 wt. % or more, or any ranges or values therebetween.

Similarly, as the native GMP is acted upon by one or more enzymes, the denatured whey protein composition may have an increased proteolysis index in some embodiments. Proteolysis index is a measure of the increase of non-protein nitrogen (NPN) in relation to the total Kjeldahl nitrogen (TKN) of a sample, for which the method for determining is described in the examples below. Namely, the proteolysis index (PI) increases in a sample as protein is broken down by enzymatic activity to its primary amino acids or small peptides that become soluble in trichloroacetic acid, known as non-protein nitrogen, and can therefore be an indicator for protein hydrolysates. Thus, in some embodiments, the denatured whey protein composition according to the present technology may have a proteolysis index of about 6 wt. % or greater, such as about 7 wt. % or greater, such as about 8 wt. % or greater, such as about 9 wt. % or greater, such as about 10 wt. % or greater, such as about 12.5 wt. % or greater, such as about 15 wt. % or greater, such as about 17.5 wt. % or greater, such as about 20 wt. % or greater, such as about 22.5 wt. % or greater, such as about 25 wt. % or greater, or any ranges or values therebetween.

Furthermore, while, in some embodiments as discussed above, the denatured whey protein composition may be considered to be "high fat" and have a fat content of about 7% or greater, based upon the dry basis weight of the whey protein feedstock, such as about 8% or greater, such as about 9% or greater, such as about 10% or greater, such as about 11% or greater, such as about 12% or greater, such as about 13% or greater, such as about 14% or greater, such as about 15% or greater, such as about 16% or greater, such as about 17% or greater, such as about 18% or greater, such as about 19% or greater, such as about 20% or greater, such as about 20.5% or greater, or any ranges or values therebetween However, in some embodiments, the denatured whey protein composition contains less than 7 wt. % of fat, such as about 6.5 wt. % or less, such as about 6 wt. % or less, such as about 2 wt. % or greater, or any ranges or values therebetween.

Nonetheless, the particles of the denatured whey protein composition according to the present technology can have an average particle diameter of about 0.001 µm to about 11 such as about 0.005 µm to about 9 such as about 0.01 µm to about 7 such as about 0.015 µm to about 5 or any ranges or values therebetween.

Surprisingly, the present technology has found that by forming a low native GMP denatured whey protein composition as discussed herein, a narrow particle size distribution of the whey proteins can be obtained, which can further improve the flavor attributes of the denatured whey protein composition of the present technology. For instance, the particles can have a D90 particle size distribution value, which is the particle diameter where 90% of the sample's mass includes particles of that size or smaller, of about 8 µm or less, such as about 7 µm or less, such as about 6 µm or less, such as about 5 µm or less, such as about 4 µm or less, such as about 3 µm or less, such as about 2 µm or less, such as about 1.75 µm or less, such as about 1.5 µm or less, such as about 1.25 µm or less, or any ranges or values therebetween.

Furthermore, the particles can have a D50 particle size distribution value, which is the particle diameter where 50% of the sample's mass includes particles of that size or smaller, of about 5 µm or less, such as about 4.5 µm or less, such as about 4 µm or less, such as about 3.5 µm or less, such as about 3 µm or less, such as about 2.5 µm or less, such as about 2 µm or less, such as about 1.5 µm or less, such as about 1 µm or less, such as about 0.75 µm or less, such as about 0.5 µm or less, such as about 0.3 µm or less, or any ranges or values therebetween.

Additionally or alternatively, the particles can have a D10 particle size distribution value, which is the particle diameter where 10% of the sample's mass includes particles of that size or smaller, of about 3 µm or less, such as about 2.5 µm or less, such as about 2 µm or less, such as about 1.5 µm or less, such as about 1 µm or less, such as about 0.5 µm or less, such as about 0.4 µm or less, such as about 0.3 µm or less, such as about 0.2 µm or less, such as about 0.1 µm or less, such as about 0.05 µm or less, or any ranges or values therebetween.

As discussed above, the denatured whey protein composition can be packed in denatured form or can be incorporated into a food or beverage product to produce a fortified food and/or beverage. Suitable food and beverage products can include protein bars, granola bars, yogurts, drinkable yogurts, pudding products, ready to drink beverages, ready to mix beverage powders, bakery products, medical nutrition products, nutraceutical products, meat products, cheese, butter, grain products, cream cheese, milk products, and the like.

As an example only of a product and a method for fortifying the product utilizing a denatured whey protein composition as discussed herein, a yogurt composition may be formed as known in the art. For instance, a spoonable or drinkable yogurt milk, which may contain whole milk, defatted milk, or a combination thereof fortified with a denatured whey protein composition according to the present technology, may be sent to a fermenter, where yogurt cultures are added, yielding a yogurt mix. The yogurt mix may then be combined with further ingredients or flavorings and packaged.

A fortified food and/or beverage product as discussed herein may have a viscosity, the method for which will be discussed in greater detail in the examples, of about 500 centipoise (cP) or less, such as about 400 centipoise or less, such as about 300 centipoise or less, such as about 250 centipoise or less, such as about 200 centipoise or less, such as about 150 centipoise or less, such as about 100 centipoise or less, such as about 50 centipoise or less, or any ranges or values therebetween.

Furthermore, a fortified food and/or beverage product as discussed herein can be fortified to a protein level of greater than 3%, or about 8 wt. % or greater, based upon the weight of the food and/or beverage product, such as about 8.5 wt. % or greater, such as about 9 wt. % or greater, such as about 9.5 wt. % or greater, such as about 10 wt. % or greater, such as about 12.5 wt. % or greater, such as about 15 wt. % or greater, such as about 17.5 wt. % or greater, such as about 20 wt. % or greater, such as about 22.5 wt. % or greater, such as about 25 wt. % or greater, such as about 27.5 wt. % or greater, such as about 30 wt. % or greater, or any ranges or values therebetween.

Furthermore, certain embodiments of the present disclosure may be better understood according to the following examples, which are intended to be non-limiting and exemplary in nature.

EXAMPLES

Test Methods and Procedures
Quantification of Glycomacropeptide (GMP), Alpha-Lactalbumin (Alpha-La) and Beta-Lactoglobulin (Beta-Lg)

Quantification of GMP was determined by Beckman Capillary Electrophoresis system. The capillary is a DOV-17010H Deactivated TSP standard FS tubing (600 mm×50 µm) with a slit opening of 100×800 µm and regenerated/activated with 0.1N HCl solution.

Preparation of Sample solution:
Prepare a 1% Protein solution with deionized (DI) water of each sample
Vortex samples until homogenous.
Let powder samples hydrate for at least 30 minutes before continuing with sample prep.
Prepare sample buffer using 0.0787 g of DTT (threo-1,4-Dimercapto-2,3-butanediol) and 30 g of reducing buffer. Reducing buffer consists of 167 mM Tris, 42 mM 3-morpholino-propanesulfonic acid, 67 mM ethylenedinitrilotetraacetic acid disodium, 0.5 g/L methyl hydroxypropyl cellulose in 8M urea solution.
After samples are hydrated, mix sample buffer and sample in a 1:1 ratio to a total of 4 mL.
Vortex the sample and let sit for one hour.
Filter samples into glass vials using PVDF 0.22 µm syringe filter. Put caps on glass vials. Sample solution is injected for 10 s at 3.4 Kpa. The separation is conducted under 45° C. at 25 KV (increasing from 0 to 25 KV within 3 min initially). Detection of milk proteins is performed at 214 nm. Quantity of each protein component is determined by comparing the peak area of each component peak to the total peak areas. On this example:

$$GMP\% = \frac{\text{Peak area for } GMP}{\text{Sum of Peak areas for all proteins}} \times 100\%$$

$$\frac{\text{Beta\_Lg}}{\text{Alpha\_La}} = \frac{\text{Peak area for Beta\_Lg}}{\text{Peak area for Alpha\_La}}$$

Quantification of Fat
The fat component is determined by the Mojonnier modification of the Roese-Gottlieb procedure for fat extraction (Reference method AOAC 989.05). The Roese-Gottlieb procedure uses ether to extract the fat from dairy products. Calculate:

$$\text{Fat}\% = \frac{\text{Weight of Fat} - \text{Blank}}{\text{weight of sample}} \times 100\%$$

Where:
Weight of Fat: (weight sample beaker after extraction)− (the weight of the empty beaker).
Blank: an analytical blank determination must be subtracted from the weight of fat obtained.

Weight of Sample: weight of sample prior to extraction procedure.

Quantification of Protein Analysis by Total Kjeldahl Nitrogen (TKN)

The protein analysis by Kjeldahl Nitrogen (Reference method AOAC 991.20) is used to determine the percent of nitrogenous compounds by weight. Sulfuric acid digests proteins and other nitrogenous compounds converting the nitrogen into ammonium sulfate. A catalyst is used to increase the reaction rate and to raise the boiling point of sulfuric acid. Titration of the ammonia with standard hydrochloric acid gives the amount of nitrogen associated with protein and soluble nitrogen.

Determination of TKN (Crude Total Protein)

$$TKN\% = \frac{\Delta mL * N * 14.007 * 6.38}{10 * W}$$

Where:
- $\Delta mL$=the amount of standardized HCl added to the sample—the amount added to the blank in mL (often calculated by the distillation apparatus and given as $\Delta mL$).
- N=the exact normality of the standardized HCl from the Certificate of Analysis in meq/mL units.
- 14.007=Formula weight of nitrogen in mg/meq.
- The constant 6.38 is the number of grams of dairy protein per gram of nitrogen. Other constants are 4.7218 for ammonium sulfate, and 7.2904 for 1-tryptophan.
- W=the sample size in grams.
- Division by 10 gives the result as g per 100 grams.
- The result is expressed as the percentage of protein by weight (# of grams per 100 grams sample).

Determination of NPN (Non-Protein Nitrogen)

Non-protein nitrogen (NPN) consists of urea, ammonia, free amino acids, creatine, uric acid, peptides, and amino alcohols of phospholipids (Ruska and Jonkus 2014) which are soluble in trichloroacetic acid. Generally greater than 30 amino acids are sufficient to qualify a polypeptide as protein, though not a definitive rule, peptide consisting of less than 30 amino acids likely are found in the TCA soluble fraction and classified as non-protein nitrogen. The method uses addition of trichloroacetic acid (TCA) to precipitate proteins. The protein is filtered out and the non-protein nitrogen determined in the filtrate. The amount of non-protein nitrogen can then be determined.

Sample Preparation
- A. Mix sample well.
- B. Tare a 150 mL beaker or 4 oz snap-cap. For powder or solid samples, add 10-15 glass balls to the beaker or snap cap before tare.
- C. Transfer appropriate number of samples to the tared beaker base on the table below. Record sample weight to nearest 0.0001 g. For powder or solid samples, add 20 mL of DI water and shake to constitute the sample.
- D. Using a graduated cylinder or automatic dispenser, add 15 mL of 33% TCA to the sample.
- E. Place the beaker or snap-cap back on the balance.
- F. Add DI water to the sample until the total mass of sample, TCA solution, and added water, is approximately 50 g. Record gross weight.
- G. Mix well, let solution stand for 10 minutes.
- H. Filter through slow filter paper, into a clean snap cap or beaker.
- I. Transfer approximately 7-10 g filtrate to a Kjeldahl digestion tube. Record the exact mass of filtrate added.
- J. Test on TKN (Total Kjeldahl Nitrogen) method to determine Nitrogen in the filtrate (N) for the calculation below:

$$NPN\% = \frac{mL * N * 14.007 * 6.38}{W * A/B/10}$$

- mL=the amount of standardized HCl required to titrate the sample distillate.
- N=the exact normality (meq/mL) of the standardized HCl from the lot Certificate of
- Analysis (COA) or as determined in the laboratory.
- 14.007=Formula weight of nitrogen in mg/meq.
- 6.38 is factor converting nitrogen to dairy protein
- W=The grams of sample filtrate used
- A=the grams of sample used
- B=the total grams of sample solution
- 10 convert the result to grams per 100 grams.

Determination of True Protein

True protein is the measure of total nitrogen (TKN) (sometimes referred to as crude protein), with the non-protein nitrogen (NPN) content subtracted out. True Protein=TKN−NPN and is expressed as a percentage of true protein by weight (grams of true protein per 100 grams of sample).

Determination of Proteolysis Index (PI)

Proteolysis index is a measure of the increase of non-protein nitrogen (NPN) in relation to the total Kjeldahl nitrogen (TKN) of a sample. The proteolysis index (PI) increases in a sample as protein is broken down by enzymatic activity to its primary amino acids or small peptides that become soluble in trichloroacetic acid, known as non-protein nitrogen.

$$PI = \frac{NPN\%}{TKN\%} \times 100\%$$

Proteolysis index is expressed as NPN percentage of total crude protein (TKN) by weight (# of grams of NPN per 100 grams of Total crude protein).

Determination of Denatured Whey Protein

The denatured whey protein (DWP) method is a measure of whey proteins that have undergone a disruption and possible destruction of both secondary and tertiary structures rendering the protein insoluble in an environment in which the native protein would typically be soluble.

Sample Preparation
  Prepare a solution of sample at approximately 1.2% (w/w) protein. Adjust pH to 6.8 using either 0.1N HCl or 0.1N NaOH.
  Record sample weight and final solution weight after pH adjustment.
  Split volume into two fractions for testing—
    10 ml for Total TKN. Test for TKN. This will be % Total TKN.
    25 g for DWP fractions in a beaker for treatment as follows.

Determination of Denatured Whey Protein (pH 4.6) Fraction
  Add ~10 mL distilled water to the beaker containing the DWP fraction.

Place small magnetic stir bar into beaker. Place beaker on stir plate, insert pH probe and temperature compensator into the solution. Start stirrer.

Adjust the pH to 4.60±0.02 by adding 1 normal HCl for gross adjustment and 0.1 normal HCl for fine adjustment.

Place the beaker on the balance. Bring weight of solution to ~50 g (e.g., tare weight plus 50 g) with distilled water. Record weight to nearest 0.0001 g.

Let solution rest at room temperature for one hour. Swirl the beaker contents for 10-15 seconds to mix. Transfer contents to a centrifuge tube.

Place tubes in centrifuge, ensuring that tubes are counterbalanced. Centrifuge at 10° C. at 10,000 rpm for 15 minutes. Do not use brake to speed deceleration.

Without transferring any of the pellet material, transfer — 10 mL of the supernatant liquid to an identified culture tube. This is the undenatured whey protein fraction. Test this supernatant for TKN. This is the "% TKN in the undenatured whey protein fraction".

Calculate Denatured Whey Protein (DWP):

$$DWP = 1 - \left( \frac{TKN\% \text{ in undernatured whey protein fraction} * \left( \frac{\text{final weight of dilution}}{\text{Weight of solution diluted}} \right)}{TKN\%} \right)$$

Determination of Particle Size Distribution

Particle size distribution analysis was determined using a Malvern Mastersizer 3000 with Hydro EV. The method parameters were 1.46 Particle refractive index, 0.0001 particle absorption index and 1.33 dispersant refractive index and water as dispersant. The Mie scattering model was used for analysis.

Example 1

A reduced-glycomacropeptide (GMP) denatured whey protein composition was made using a whey protein composition (WPC) that is greater than 25% protein on a dry weight basis from sweet whey of mozzarella cheese making. The process begins with WPC retentate (80% protein on dry basis) that is concentrated using ultrafiltration (UF) of pasteurized sweet whey separated from cheese curd. The 80% WPC (WPC80) retentate is transferred to a temperature-controlled holding tank and kept cold at about 45° F. or less, where it is mixed with water to make a 14%, protein solution. The holding tank contained a 5,000 lb batch of the whey protein mixture, where 700 pounds of protein from the 80% WPC retentate is mixed with water to form the diluted whey protein solution. The diluted whey protein solution remains in the holding tank at about 45° F. or less until the addition of a protease enzymes.

Addition of one or more enzymes, in this case, one or more protease enzymes began an incubation phase of protein hydrolysis that selectively hydrolyzes GMP in the whey protein mixture, leaving the other whey proteins such as alpha-lactalbumin and beta-lactoglobulin largely unhydrolyzed. In this experiment, the protease enzyme included at least one alkaline serine protease enzyme and at least one neutral protease enzyme. The one or more protease enzymes were added to the whey protein mixture at a level of about 0.001% to about 5%, or about 0.012% by wt. or less of the total protein in the substrate in this example. For the 5,000-pound batch, about 38 g of enzyme was added.

The hydrolysis phase lasted for at least 5 hours with agitation at <45° F. but can continue for up to 72 hours or more without hydrolysis of the major whey proteins i.e., alpha-lactalbumin and beta-lactoglobulin. Thereafter the enzyme-treated whey protein mixture was subjected to heating to 190° F., 6 seconds (operating range of 176-195° F. and 5-90 seconds) and simultaneous mechanical shearing to achieve enzyme deactivation and whey protein denaturation. Following heating and mechanical shearing, the resulting denatured whey protein mixture is subjected to optional cooling (e.g., 50° F.) and concentration (e.g., by evaporation or nanofiltration), followed by spray drying to produce a powdered reduced-GMP denatured whey protein composition.

Figure 2A:
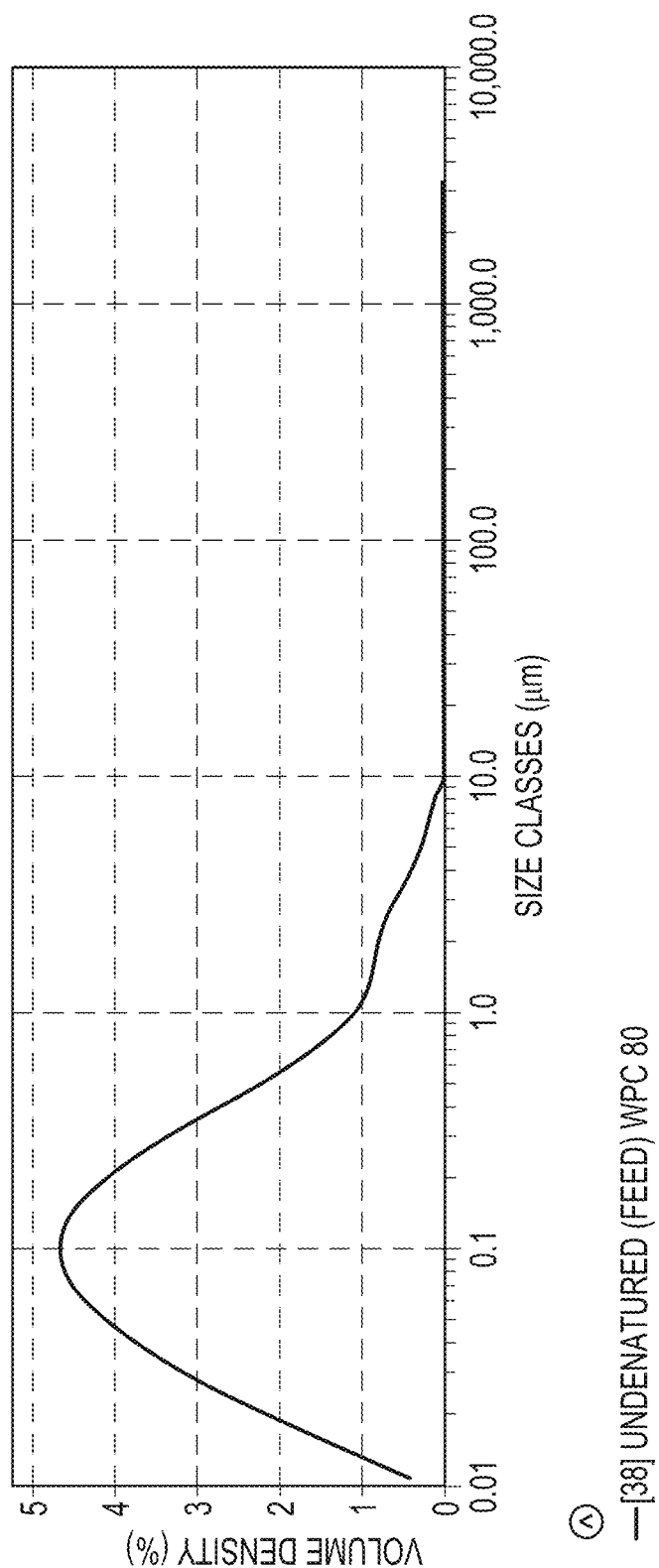
FIG. 2A is a graph illustrating the particle size distribution of an undenatured whey protein composition (WPC) having 80% protein on a dry basis.
Figure 2B:
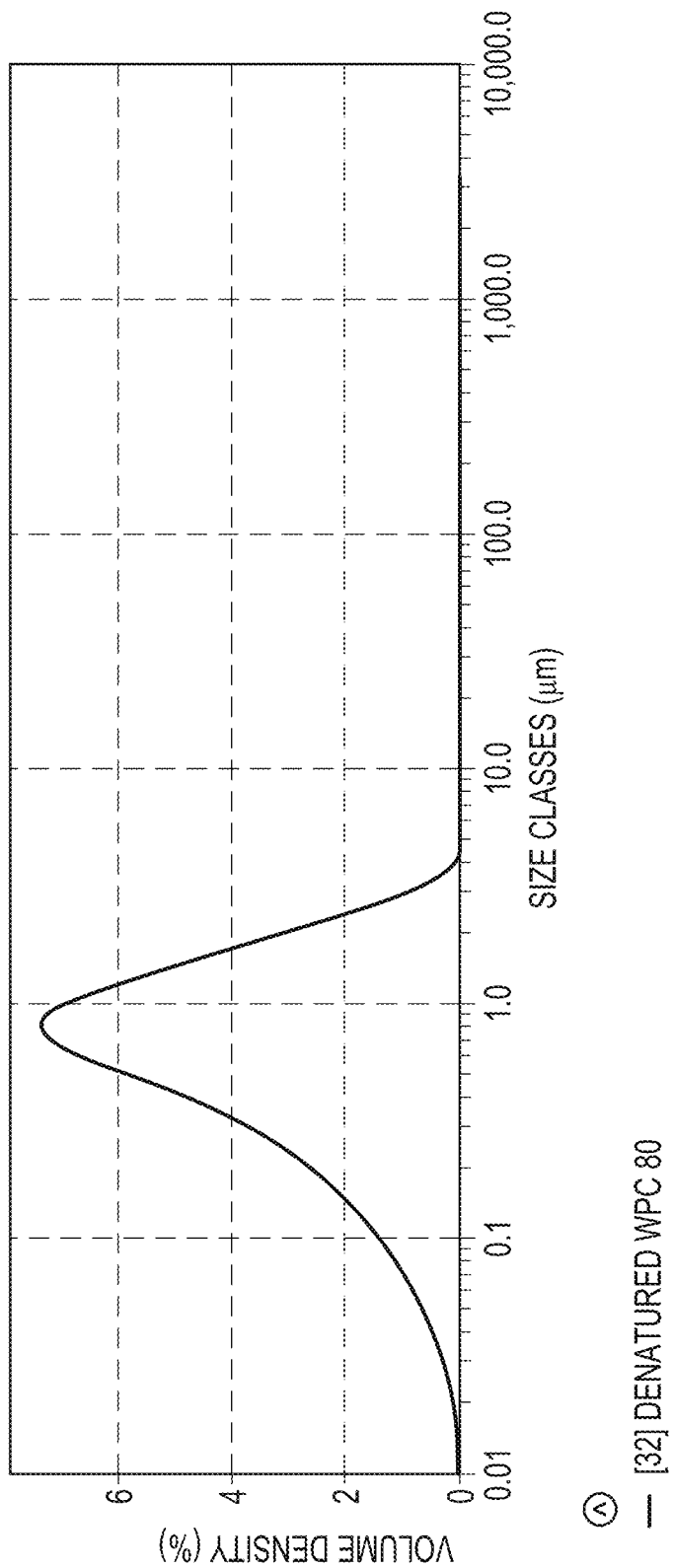
FIG. 2B is a graph illustrating the particle size distribution of a denatured whey protein composition according to embodiments of the present disclosure.
Figure 2C:
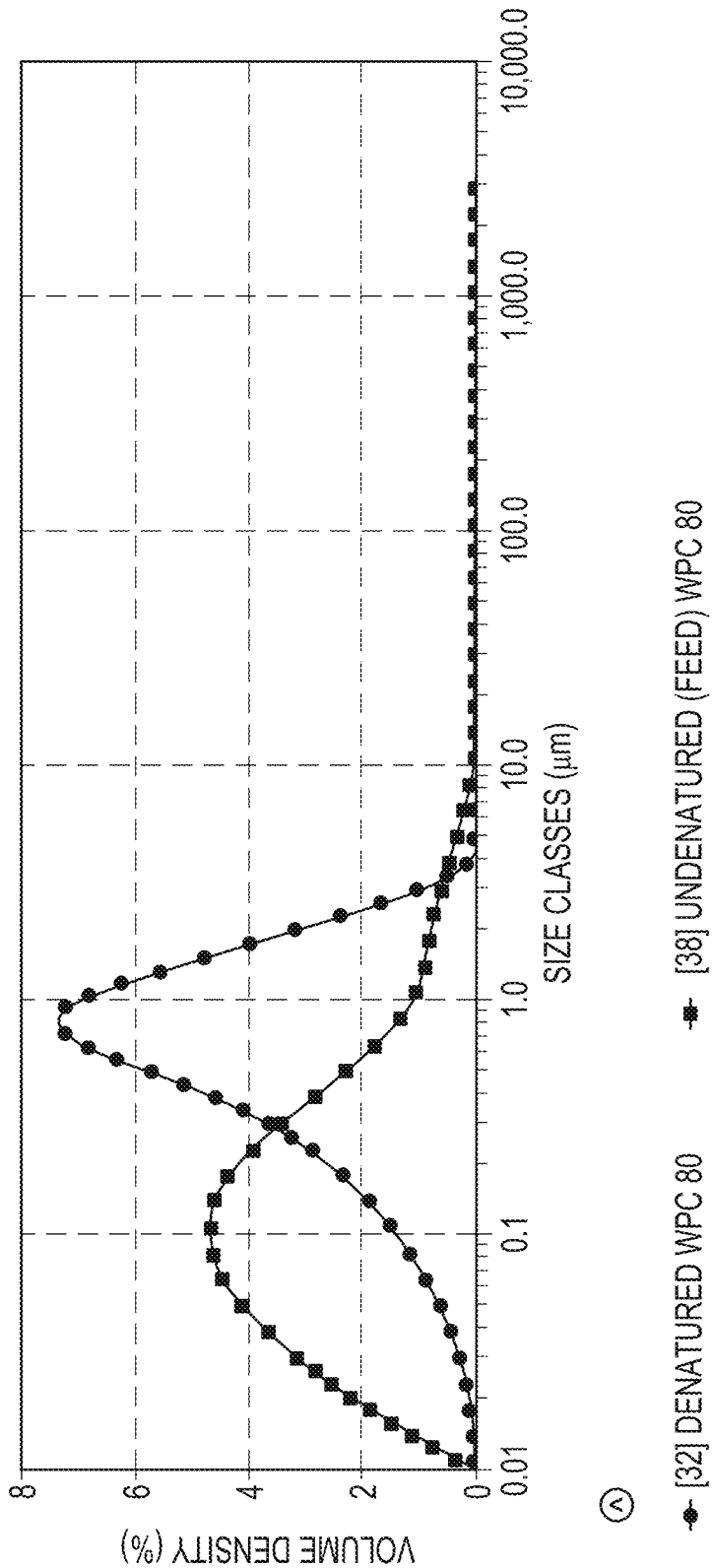
FIG. 2C is a graph comparing the particle size distribution of FIGS. 2A and 2B.

As illustrated in FIGS. 2A to 2C, particle size distribution of the microparticulated denatured whey protein composition as compared to the whey protein feedstock (characterized by a D90) was of less than or about 1.7 micrometers (mm) and exhibited a narrower range than that of the feedstock.

FIG. 2A illustrates the undenatured (feed) particle size with a particle size range of 0.011 to 9.86 micrometer. Following enzyme hydrolysis of the GMP and subsequent enzyme inactivation and whey protein denaturation the particle size is reduced to a range of 0.017 to 4.03 micrometers as shown in FIG. 2B. FIG. 2C provides a comparison overlay of the particle size distribution for both the whey protein feedstock and Sample 1.

Figure 3A:
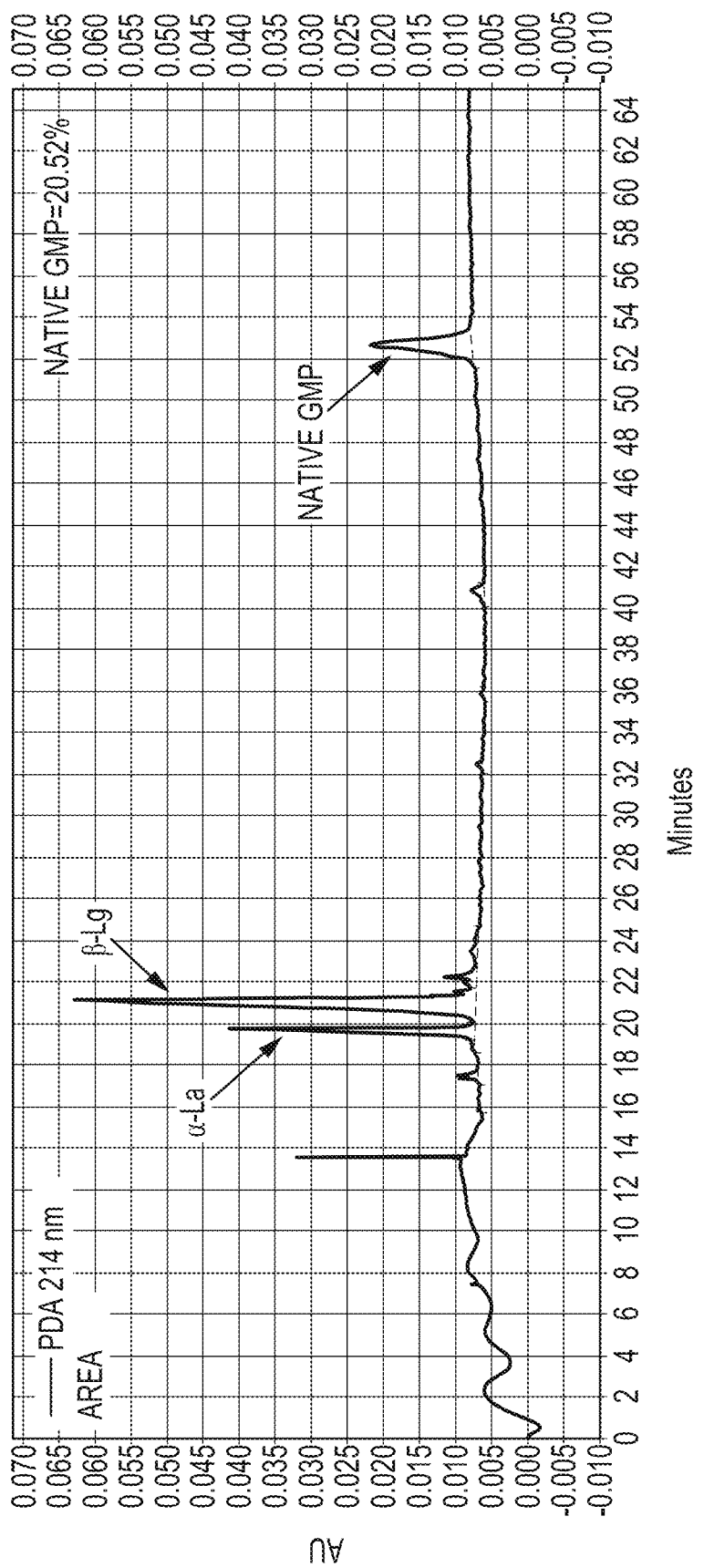
FIG. 3A is a graph showing a capillary electrophoresis profile of an undenatured whey protein composition (WPC) having 80% protein on a dry basis.
Figure 3B:
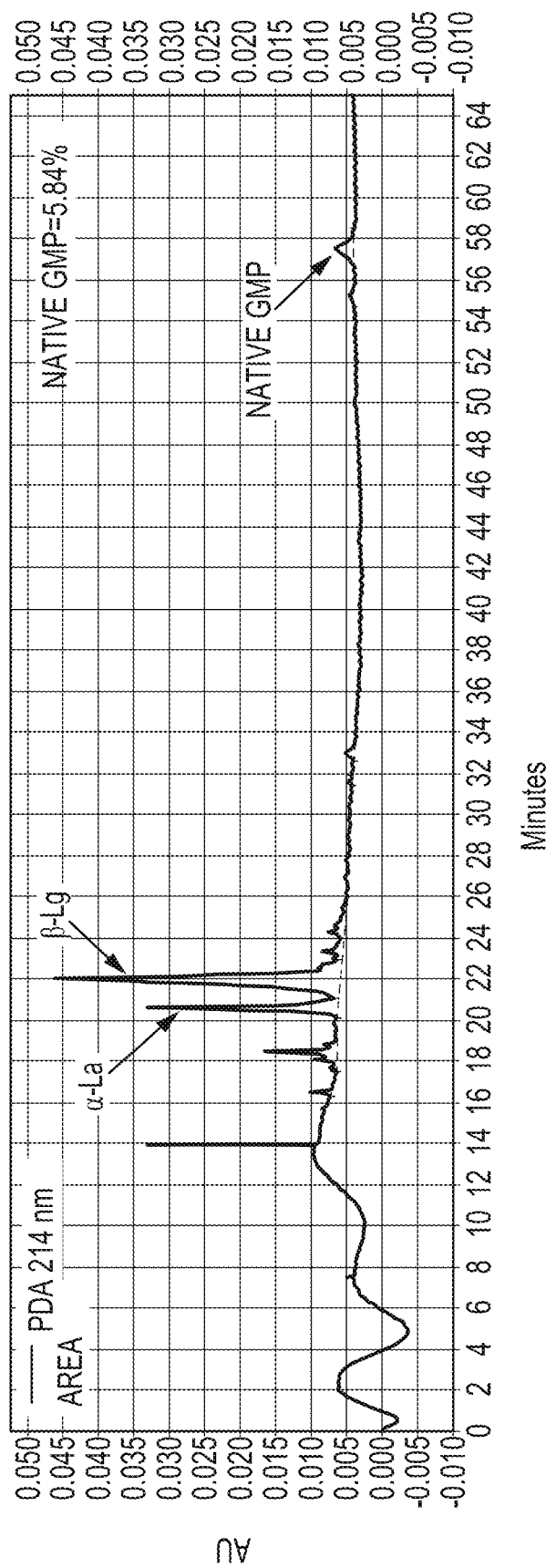
FIG. 3B is a graph showing a capillary electrophoresis profile of a denatured whey protein composition according to embodiments of the present disclosure.

The level of native GMP by weight of the total protein of the whey protein composition feedstock and the microparticulated denatured whey protein composition is determined by capillary electrophoresis (CE) and defined as a division of peak area of the native GMP by total protein peak area on the CE graph as illustrated in FIGS. 3A and 3B.

As discussed above denatured whey protein (DWP) and proteolysis index (PI), defined as a division of non-protein nitrogen by total nitrogen, are determined by wet chemistry analysis. Table 1 illustrates the reduction of native GMP from typical cheese whey levels of 12-25%, in this case 20.52% to less than 8%, and specifically 5.84%. Likewise, as GMP hydrolysis occurs there is a concomitant increase in the proteolysis index as the native GMP protein is broken into smaller pieces that result in increased amounts of non-protein nitrogen. FIGS. 3A and 3B illustrate that while GMP is substantially reduced during the hydrolysis it is a result of the controlled hydrolysis that alpha-lactalbumin (a-La) and beta-lactoglobulin (b-Lg) remain largely unhydrolyzed, and further illustrated by the minimal reduction (<10%) in the beta-lactoglobulin to alpha-lactalbumin ratio (Table 1). The increase in denatured whey protein is a direct result of time and temperature treatment during the enzyme inactivation procedures.

TABLE 1

| Sample Description | Dx (10) (μm) | Dx (50) (μm) | Dx (90) (μm) | PDB %[2] | FDB %^ | DWP (%)* | PI (%)[1] | Native GMP (%) | Beta-lactoglobulin to Alpha-lactalbumin ratio |
|---|---|---|---|---|---|---|---|---|---|
| 80% WPC Retentate | 0.026 | 0.110 | 0.480 | 81.03 | 6.35 | 17.27 | 6.35 | 20.52 | 3.37 |
| Reduced-GMP denatured WPC 80 | 0.138 | 0.650 | 1.690 | 81.03 | 6.35 | 78.76 | 14.90 | 5.84 | 3.13 |

*Denatured whey protein %
^Fat on a dry basis %
[1]proteolysis index
[2]Protein on a dry basis %

Example 2

Feed material of high fat whey protein composition (hfWPC) feedstock was obtained from a microfiltration membrane filtration process. The composition of feed material taken from the retentate side of the microfiltration process was 75.48% protein on a dry basis and 17.66% fat on a dry basis. The high fat whey protein composition feed was adjusted to 14% protein (operating range 10-24%) by adding water.

Denaturation of the protein was achieved by preheating the feed to 130° F. (operating range 120-150° F.), then heating to a denaturation temperature of 176-195° F. and holding for 5-90 sec, and mechanically shearing simultaneously during the heating for particle size control. Following the heating and shear process, the denatured whey protein composition was cooled to a temperature below 50° F., dried to powder by spray drying to form Sample 2.

Figure 4A:
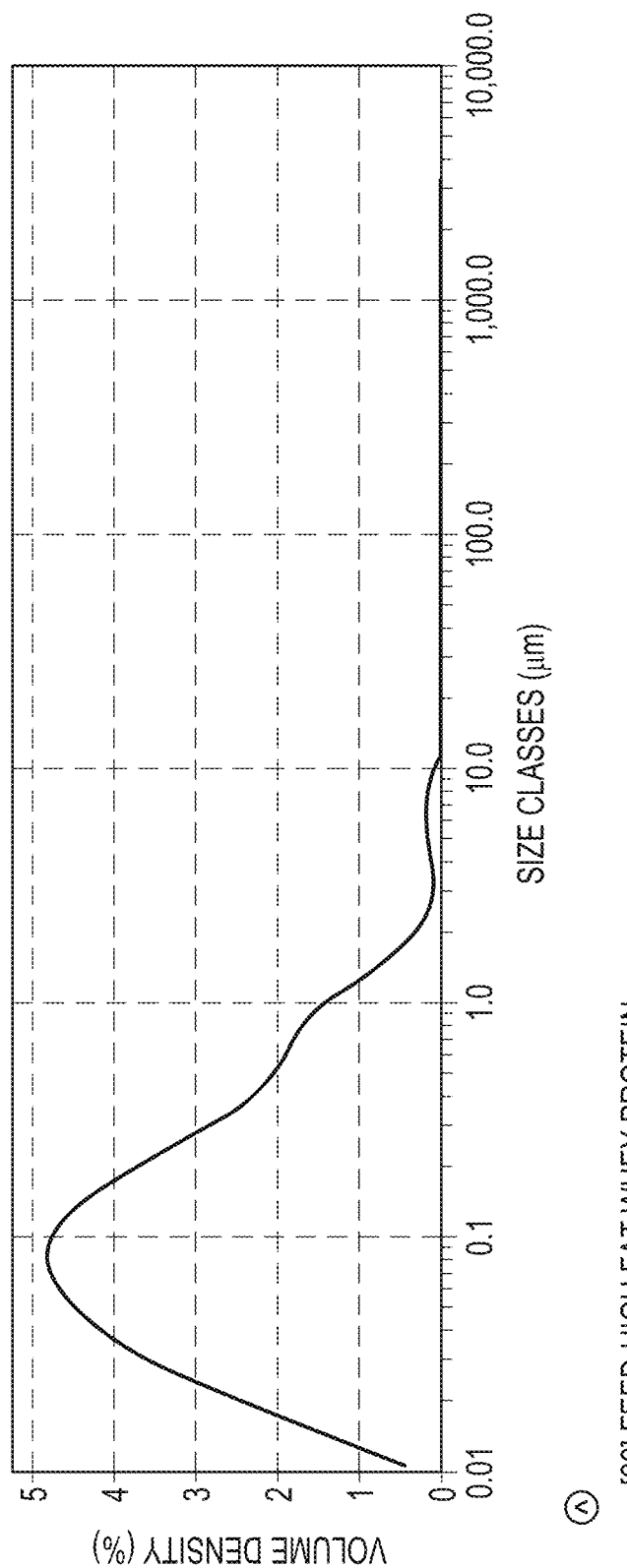
FIG. 4A is a graph illustrating the particle size distribution of an undenatured high fat whey protein composition.
Figure 4B:
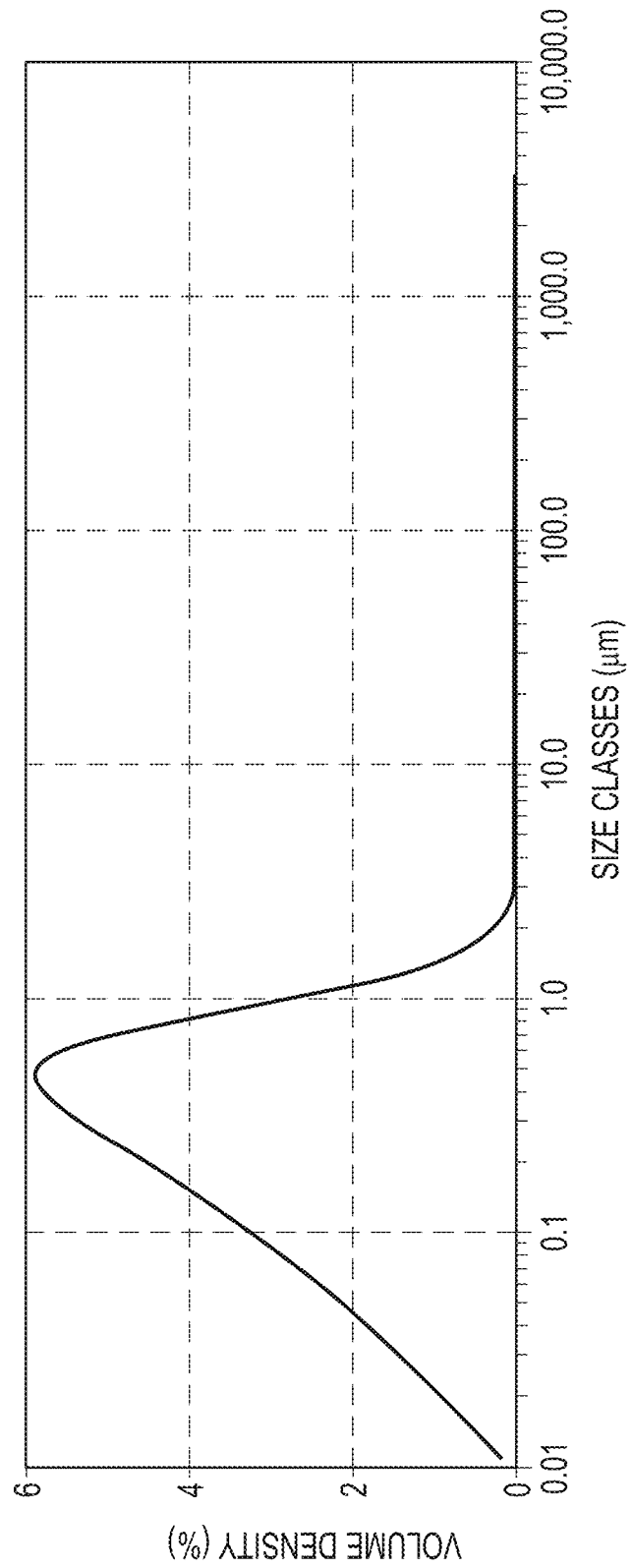
FIG. 4B is a graph illustrating the particle size distribution of a denatured high fat whey protein composition according to embodiments of the present disclosure.
Figure 4C:
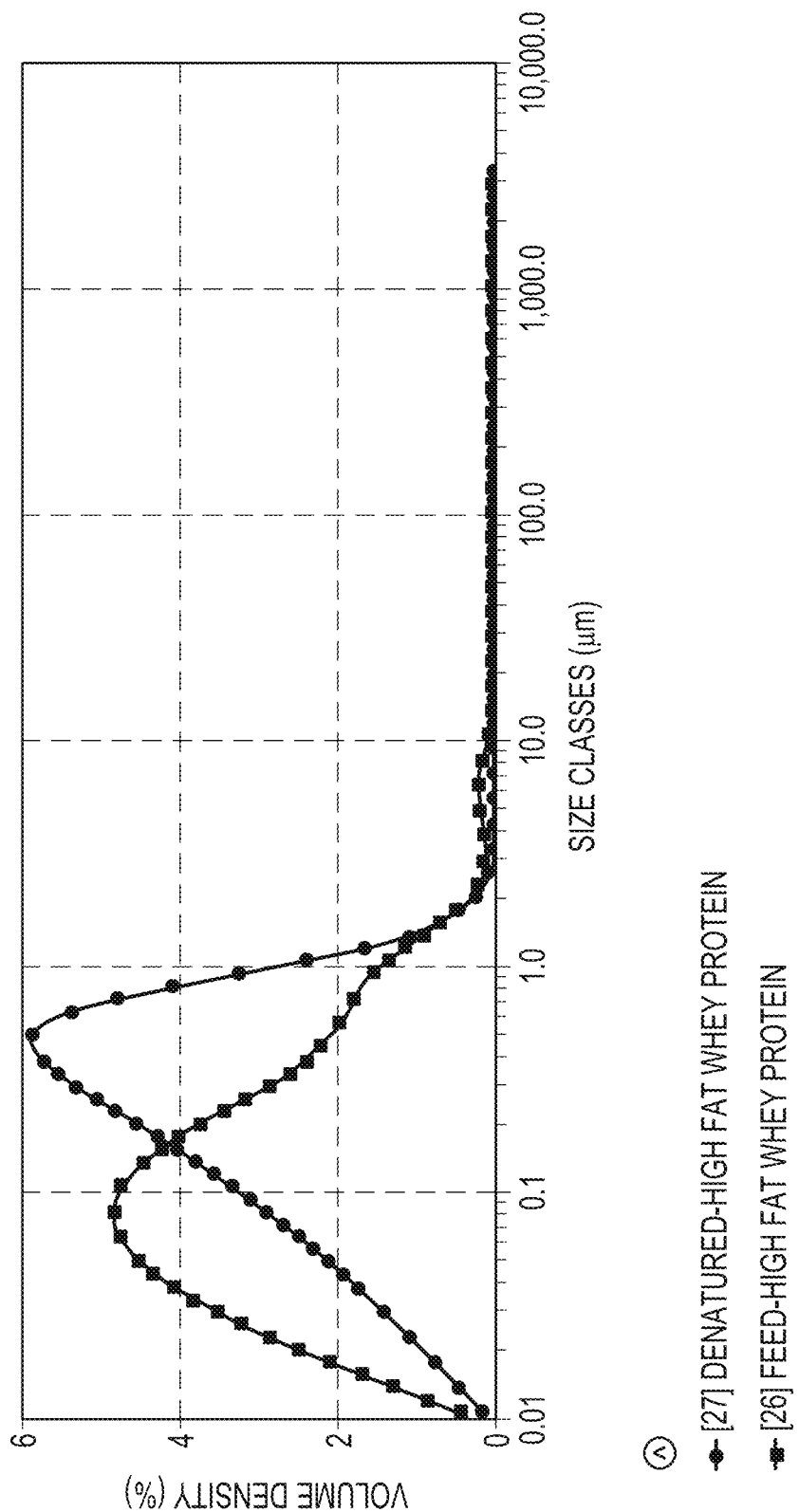
FIG. 4C is a graph comparing the particle size distribution of FIGS. 4A and 4B.

The denatured high fat whey protein composition was analyzed for total solids, fat, protein, denatured whey protein, and particle size distribution the results of which are illustrated in Table 2 and FIGS. 4A-4C, namely, the results of undenatured high fat whey protein composition before (feed) and after denaturation-shearing process. FIG. 4A illustrates the high fat WPC feedstock had particle size range of 0.011 to 11.2 micrometers. Following denaturation and shearing processes, the particle size was reduced to a range of 0.011 to 2.75 micrometer as illustrated in FIG. 4B. FIG. 4C provides a comparison overlay of the particle size distribution for both the feed high fat WPC feedstock and denatured high fat WPC.

As noted above, the present technology has found that the high fat WPC formed herein exhibits a different chemistry compared to the WPC 80 as is shown Table 1. The starting feedstock of the high fat WPC has a lower GMP (10.5 vs 20.5%), higher denatured whey protein (DWP) (45.10 vs 17.27%), higher fat on a dry bases (17.66 vs 6.35) and higher ratio of Beta-lactoglobulin to Alpha-lactalbumin (7.65 vs 3.37) compared to the starting feed WPC 80. The production of the high fat WPC uses ultrafiltration and microfiltration while production of WPC80 uses only ultrafiltration. One explanation may be that due to the pore size of microfiltration membranes, the majority of DWP and fat are captured in the retentate while some of GMP, alpha-lactalbumin, beta-lactoglobulin and other whey proteins pass through to the permeate side. It is thought that, as Beta-lactoglobulin is more prone to denaturation during milk and subsequent sweet whey pasteurization compared to alpha-lactalbumin, the retained protein contains more denatured beta-lactoglobulin than alpha-lactalbumin. Therefore, the ratio of beta-lactoglobulin to alpha-lactalbumin in high fat WPC is higher than that in WPC80. Interestingly despite different DWP values in the starting feed materials, the final denatured high fat WPC (hfWPC) and denatured WPC80 achieved similar particle size distributions and denatured whey protein (DWP) values (compare FIGS. 2C vs. 4C and Tables 1 vs 2).

TABLE 2

| Product | Dx (10) (μm) | Dx (50) (μm) | Dx (90) (μm) | Denatured whey protein % | Protein on a dry basis % | Fat on a dry basis % | Beta-lactoglobulin to Alpha-lactalbumin ratio | GMP % |
|---|---|---|---|---|---|---|---|---|
| Starting Feed - Undenatured Reduced-GMP hfWPC | 0.0246 | 0.101 | 0.676 | 45.10 | 75.48 | 17.66 | 7.65 | 10.50 |
| Denatured - hfWPC | 0.0453 | 0.266 | 0.821 | 82.70 | 75.48 | 17.66 | 7.65 | 10.50 |

Example 3

Denatured whey protein compositions were utilized to fortify drinkable yogurt applications to observe the functional benefit in managing viscosity of high protein products. The samples according to Example 3 were formed using the following process of yogurt making:

1. Blend ingredients of base recipe (Table 3) and achieve homogenous solution
2. Pasteurize at 80-85° C. (176-185° F.) for 30 min.
3. Cool to 42° C. (108° F.).
4. Inoculate starter culture (CHR Mild 2.0) at 0.02%
5. Maintain temperature at 42° C. (108° F.) during the fermentation process
6. Stop the fermentation process when pH reaches 4.6.
7. Store at 4° C. (39° F.)

TABLE 3

Drinkable Yogurt base Recipes

| Ingredients | Control (no added WPC) 10% protein fortified w/ Ultrafiltered Milk W/W % in base recipe | 10% Protein fortified w/ regular-GMP undenatured WPC80 W/W % in base recipe | 10% Protein fortified w/ reduced-GMP denatured WPC80 W/W % in base recipe | 10% Protein fortified w/ reduced-GMP Undenatured hfWPC W/W % in base recipe | 10% Protein fortified w/ reduced-GMP denatured hfWPC W/W % in base recipe |
|---|---|---|---|---|---|
| Skim milk | 14.6 | 90.8 | 90.8 | 90.8 | 90.8 |
| Ultrafiltered Milk | 68.9 | 0.0 | 0.0 | 0.0 | 0.0 |
| Regular-GMP undenatured WPC80 | 0.0 | 9.2 | 0.0 | 0.0 | 0.0 |
| Reduced-GMP denatured WPC80 | 0.0 | 0.0 | 9.2 | 0.0 | 0.0 |
| Reduced-GMP Undenatured HfWPC | 0.0 | 0.0 | 0.0 | 9.2 | 0.0 |
| Reduced-GMP denatured HfWPC | 0.0 | 0.0 | 0.0 | 0.0 | 9.2 |
| Sweet cream | 3.8 | 0.0 | 0.0 | 0.0 | 0.0 |
| Lactose | 1.7 | 0.0 | 0.0 | 0.0 | 0.0 |
| Water | 11.0 | 0.0 | 0.0 | 0.0 | 0.0 |
| Total | 100 | 100 | 100 | 100 | 100 |

The samples and control were then analyzed for protein, total percent solids, and viscosity, the results of which are shown in Table 4:

TABLE 4

| Drinkable Yogurt - fortified with | Protein % | Total Solids % | Viscosity (cP) |
|---|---|---|---|
| Control (no added WPC) | 10.00 | 18.00 | >25,000 |
| Regular-GMP undenatured WPC80 (Control) | 8.32 | 14.42 | 4,040 |
| Reduced-GMP denatured WPC80 | 10.08 | 16.54 | 90 |
| Reduced-GMP undenatured hfWPC (Control) | 9.94 | 16.93 | 860 |
| Reduced-GMP denatured hfWPC | 10.03 | 17.06 | 80 |
| Commercial Reference | 7.54 | 14.02 | 580 |

*Brookfield viscosity meter via spindle #6@100 rpm, 42° F. temperature

Figure 5:
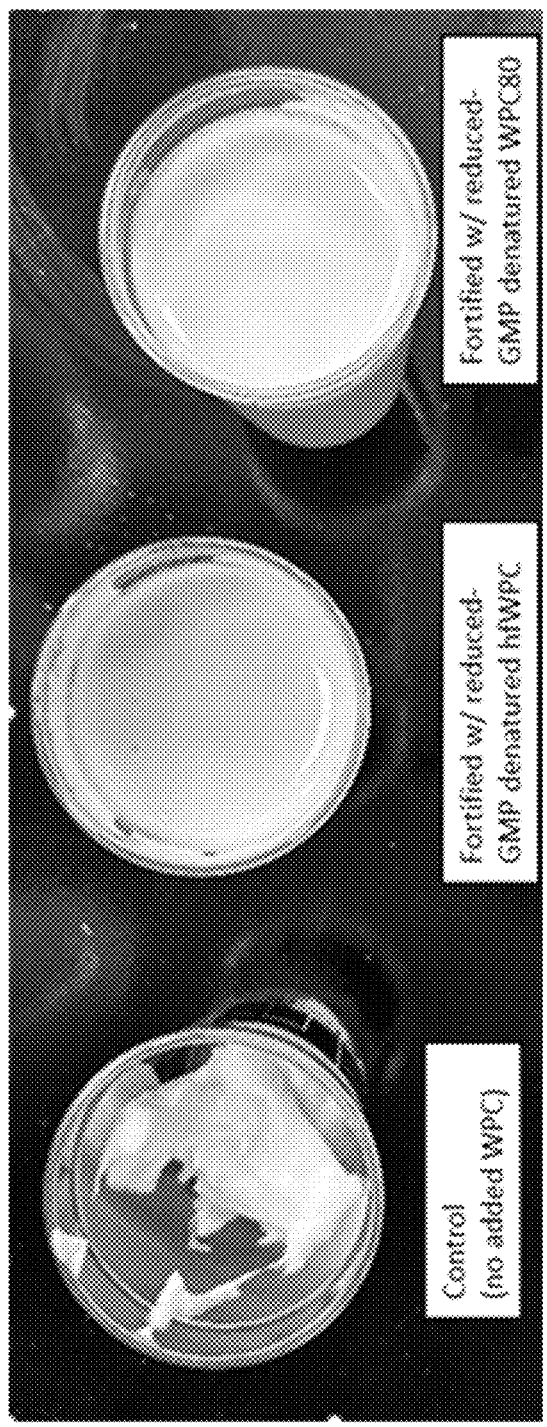
FIG. 5 is an illustration of the samples according to Example 3.

Various levels of protein fortification may be of interest to consumers. Examples of protein fortification in drinkable yogurt is illustrated in Tables 3 and 4 and FIG. 5. As illustrated, drinkable yogurt fortified to 10% Protein with a reduced-GMP denatured WPC80 composition and reduced-GMP denatured hfWPC according to the present technology, have a preferred lower viscosity when compared to a commercially available product having a 7.54% protein level. Thus, the present technology exhibits a marked decrease in viscosity even at higher fortification levels. The reduced viscosity is beneficial for consumer experience due to increasing protein per serving and ease of consuming the product.

As illustrated, increasing protein in yogurt applications is challenging. Yogurt's viscosity commonly increases as protein increases. The reason is that proteins such as casein proteins and undenatured whey proteins commonly used to fortify foods bind and interact with water resulting in a higher viscosity texture. A benefit of using denatured whey compositions according to the present technology in products such as yogurt is to fortify the protein content and maintain acceptable viscosity. This is illustrated in Table 4 comparing the viscosity data of yogurt fortified with Control (no added WPC), Regular-GMP undenatured WPC80, and reduced-GMP denatured WPC80, and demonstrating the practical solution that reduced-GMP denatured whey protein composition brings to viscosity. As illustrated, the control yogurt (no added WPC) is very viscous with >25000 cP viscosity and is therefore not pourable and not acceptable as a drinkable yogurt product. Similarly, the drinkable yogurt fortified with regular-GMP undenatured WPC80 has a viscosity of 4040 cP, which is still too viscous to be acceptable for a drinkable yogurt product. On the other hand, yogurts fortified with reduced-GMP denatured-WPC80 according to the present technology exhibited an acceptable viscosity of 90 cP for pourability and as a drinkable yogurt product. In addition, the reduced-GMP denatured-WPC80 exhibited greatly preferred performance as compared to the commercial reference at a 580 cP viscosity.

Table 4 illustrates the viscosity data of the Control (no added WPC), reduced-GMP undenatured hfWPC, and reduced-GMP denatured hfWPC in an example that demonstrates the practical solution that reduced-GMP denatured whey protein composition brings to products with desired low viscosity. As the data illustrates, the control yogurt (no added WPC) was very viscous with a >25000 cP viscosity and was therefore not pourable and not acceptable as a drinkable yogurt product. Comparably, the drinkable yogurt fortified with reduced-GMP undenatured hfWPC exhibited a lower viscosity of 860 cP, which is still too viscous to be acceptable for a drinkable yogurt product. On the other hand, yogurts fortified with reduced-GMP denatured hfWPC according to the present technology exhibited an acceptable viscosity of 80 cP for pourability and as a drinkable yogurt product.

Example 4

Denatured whey protein compositions were utilized to fortify spoonable yogurt applications to observe the functional benefit in managing viscosity of high protein product

TABLE 5

Spoon-able Yogurt Base-recipe

| Ingredients | 14.7% Protein fortified with Undenatured reduced-GMP hfWPC % (w/w) in base recipe | 14.7% Protein fortified with reduced-GMP denatured hfWPC % (w/w) in base recipe | 14.7% Protein fortified with reduced-GMP denatured WPC80 % (w/w) in base recipe |
|---|---|---|---|
| Skimmed milk liquid | 0 | 0 | 0 |
| Ultrafiltered Milk liquid | 46.7 | 46.7 | 45.78 |
| Reduced-GMP undenatured hfWPC | 11.50 | 0 | 0 |
| Reduced-GMP denatured hfWPC | 0 | 11.50 | 0 |
| Reduced-GMP denatured WPC80 | 0 | 0 | 11.00 |
| Sweet Cream | 0 | 0 | 3.52 |
| Lactose | 2.57 | 2.57 | 1.56 |
| Water | 39.23 | 39.23 | 38.14 |
| Total | 100 | 100 | 100 |

The samples and control were then analyzed for protein, total percent solids, and viscosity, the results of which are shown in Table 6:

TABLE 6

| Spoonable yogurt fortified with | Protein % | Total Solids % | Viscosity (cP) |
|---|---|---|---|
| Commercial Reference | 10 | 22.04 | 11,000 |
| Reduced-GMP undenatured hfWPC (Control) | 14.6 | 20.17 | 63,000 |
| Reduced-GMP denatured hfWPC | 14.75 | 20.4 | 12,000 |
| Reduced-GMP denatured WPC80 | 14.93 | 20.83 | 9,000 |

Tables 5 and 6 show examples of protein fortified spoonable yogurt. The data illustrates that reduced-GMP denatured whey protein compositions according to the present disclosure exhibit higher leverage in increasing protein content of a spoonable yogurt without corresponding increases in viscosity or changes in acceptable texture. The commercial reference spoonable yogurt with 10% Protein had a viscosity of 11,000 cP. When protein is increased to 14.7% using reduced-GMP undenatured hfWPC, the viscosity was 63,000 cP which is too high for a spoonable yogurt product. However, when reduced-GMP denatured hfWPC or reduced-GMP denatured WPC80 according to the present technology were used to increase protein to 14.7%, the viscosities were 9,000 to 12,000 cP which are equivalent to the commercial reference yogurt at 10% protein. This demonstrates the advantage of using the reduced-GMP denatured whey protein composition according to the present technology to achieve an increase in protein content of spoonable yogurt while maintaining viscosity. Such improvements also improve the consumer experience due to the more familiar viscosity and texture.

Example 5

Samples of 80% protein on a dry basis undenatured whey protein concentrate, reduced-GMP denatured WPC 80, undenatured high fat WPC, and denatured WPC were each prepared for descriptive flavor analysis. Whey proteins were rehydrated at 10% (w/v). Products were dispensed into lidded soufflé cups with 3-digit codes and evaluated. Beverages were evaluated in duplicate by 7 trained panelists using an established sensory language for whey proteins. Descriptive analysis of flavor utilizes a 0-to-15-point universal intensity scale with the Spectrum™ method (Meilgaard and others 1999; Drake and Civille 2003). Paper ballots were used. Each panelist evaluated each product in duplicate in different sessions. Data were analyzed by a general linear model analysis of variance with Fisher's least significant difference (LSD) as a post hoc test (SAS version 9.1, Cary, NC).

Table 7 summarizes the trained panelists analysis of the samples. It is an unexpected observation that by reducing GMP and denaturing the whey proteins according to the present technology exhibit a significant reduction in cardboard flavor which is often considered an off-flavor and present in many dairy proteins. In addition, the reduction in GMP resulted in an improvement in milky flavor which is considered to be a beneficial flavor attribute in products suitable for dairy applications.

The results of the reduced-GMP denatured WPC are further substantiated by similar flavor observations when evaluating the denatured high fat whey protein composition that is naturally lower in GMP. Again, it's observed lower GMP combined with denaturing of proteins results directionally less carboard flavor, and a significant increase in milky flavor.

TABLE 7

| | Aroma Intensity | Sweet Aromatic | Cardboard | Milky | Astringency |
|---|---|---|---|---|---|
| Undenatured WPC 80 | $2.2^a$ | $1.3^a$ | $2.5^a$ | ND | $2.9^a$ |
| Reduced-GMP Denatured WPC80 | $2.4^a$ | $0.8^b$ | $1.5^b$ | $2.2^a$ | $3.2^a$ |
| Undenatured hfWPC | $1.6^b$ | $0.5^b$ | $2.6^a$ | ND | $2.9^a$ |
| Denatured hfWPC | $2.3^a$ | ND | $2.3^a$ | $1.4^b$ | $2.5^b$ |

Aroma and flavor intensities were scored on a 0 to 15-point universal intensity scale (Spectrum method, Meilgaard et al., 1999).
ND - not detected.
Means in a column followed by a different letter are different ($p < 0.05$). Attributes not listed were not detected in these samples.

What is claimed is:

1. A denatured whey protein composition comprising:
   at least 60 wt. % whey protein on a dry weight basis;
   less than 8 wt. % native glycomacropeptide (GMP) and greater than 2 wt. % enzymatically hydrolyzed GMP relative to a total weight of protein in the denatured whey protein composition;
   a proteolysis index of at least 8.0 wt. %; and
   greater than 50 wt. % denatured whey proteins relative to the total weight of the protein in the denatured whey protein composition.

2. The denatured whey protein composition of claim 1, wherein the denatured whey proteins comprise denatured enzymatically-hydrolyzed cheese whey proteins.

3. The denatured whey protein composition of claim 2, wherein the native GMP is less than or about 7 wt. % relative to the total weight of the protein in the denatured whey protein composition.

4. The denatured whey protein composition of claim 1, wherein the denatured whey proteins are characterized by a D50 particle size distribution value of less than or about 4.5 μm.

5. The denatured whey protein composition of claim 4, wherein the denatured whey proteins are further characterized by a D10 particle size distribution value of less than or about 2.5 μm.

6. The denatured whey protein composition of claim 4, wherein the denatured whey proteins are further characterized by a D90 particle size distribution value of less than or about 8.0 μm.

7. The denatured whey protein composition of claim 1, further comprising at most 7.0 wt. % fat on a dry weight basis.

8. A method of making a denatured whey protein composition, the method comprising:
   filtering cheese whey from enzymatically coagulated milk into a cheese whey retentate and a permeate; and
   reducing native glycomacropeptides (GMP) in the cheese whey retentate to form a reduced-GMP cheese whey retentate composition; and
   heating the reduced-GMP cheese whey retentate composition to form the denatured whey protein composition,
   wherein the denatured whey protein composition is characterized by
   at least 60 wt. % whey protein on a dry weight basis;
   less than 11 wt. % native GMP relative to a total weight of protein in the denatured whey protein composition;
   a proteolysis index of at least 8.0 wt. % or a beta-lactoglobulin to alpha lactalbumin ratio of greater than 5.00; and
   greater than 50 wt. % denatured whey proteins relative to the total weight of the protein in the denatured whey protein composition.

9. The method of claim 8, wherein the reduction of native GMP in the cheese whey retentate includes combining the cheese whey retentate with one or more enzymes that selectively hydrolyze GMP in the cheese whey retentate to form the reduced-GMP cheese whey retentate composition, the one or more enzymes that selectively hydrolyze GMP in the cheese whey retentate comprises at least one alkaline serine protease enzyme and at least one neutral protease enzyme, or wherein the reduction of GMP occurs through the microfiltration of the cheese whey retentate.

10. The method of claim 8, wherein the heating of the reduced-GMP cheese whey retentate composition also inactivates the one or more enzymes that selectively hydrolyze the GMP in the cheese whey retentate.

11. The method of claim 8, wherein the reduced-GMP cheese whey retentate composition is heated to a temperature of greater than or about 160° F.

12. The method of claim 8, wherein the heating of the reduced-GMP cheese whey retentate composition further comprises exposing the reduced-GMP cheese whey retentate composition to high shear conditions.

13. The method of claim 8, wherein the denatured whey protein composition is characterized by a weight ratio of native GMP to total whey protein of less than or about 0.15, and/or wherein the denatured whey protein composition is characterized by less than or about 11 wt. % GMP relative to the total weight of the protein in the denatured whey protein composition.

14. The method of claim 8, wherein the reduced-GMP cheese whey retentate, prior to the heating, already include at least 30 wt. % denatured protein.

15. A denatured whey protein composition comprising:
   at least 60 wt. % protein on a dry weight basis;
   less than 11 wt. % native glycomacropeptide (GMP) relative to total weight of the protein;
   greater than 7 wt. % fat on a dry basis;
   a beta-lactoglobulin to alpha lactalbumin ratio of greater than 5.00; and
   greater than 50 wt. % denatured whey proteins relative to the total weight of the protein.

16. The denatured whey protein composition of claim 15, wherein the denatured whey protein composition contains at least 60 wt. % beta lactoglobulin relative to a total weight of protein and/or wherein the denatured whey protein composition contains at most 12 wt. % alpha lactalbumin relative to the total weight of protein.

17. The denatured whey protein composition of claim 15, wherein the denatured whey protein composition comprises a weight ratio of beta lactoglobulin to alpha lactalbumin of greater than or about 5.

18. The denatured whey protein composition of claim 15, wherein the denatured whey proteins are characterized by a D50 particle size distribution value of less than or about 0.3 μm.

19. The denatured whey protein composition of claim 15, wherein the denatured whey proteins are further characterized by a D10 particle size distribution value of less than or about 0.1 μm.

20. The denatured whey protein composition of claim 15, wherein the denatured whey proteins are further characterized by a D90 particle size distribution value of less than or about 1.0 μm.

* * * * *